2 Sheets, Sheet 1.

Frisbie & Goodsell,
Hay Press.

N°54,644.    Patented May 8, 1866.

Witnesses
John N. Shumway

Inventors
Dennis Frisbie
Sam'l Goodsell
By their Atty
John E. Earle

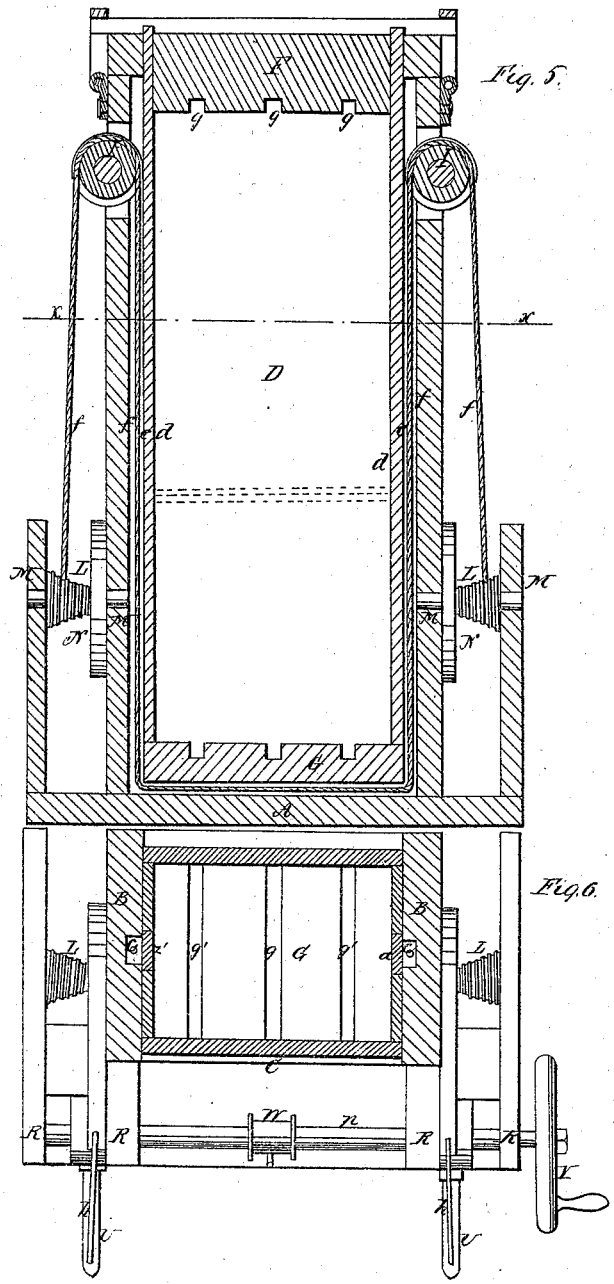

UNITED STATES PATENT OFFICE.

DENNIS FRISBIE AND SAMUEL C. GOODSELL, OF NEW HAVEN, CONN., ASSIGNORS TO THEMSELVES AND DAVID P. CALHOUN, OF SAME PLACE.

IMPROVEMENT IN BALING-PRESSES.

Specification forming part of Letters Patent No. 54,644, dated May 8, 1866.

*To all whom it may concern:*

Be it known that we, DENNIS FRISBIE and SAMUEL C. GOODSELL, of New Haven, in the county of New Haven and State of Connecticut, have invented a new and useful Improvement in Baling-Presses; and we do hereby declare the following, when taken in connection with the accompanying drawings and the letters of reference marked thereon, to be a full, clear, and exact description of the same, and which said drawings constitute part of this specification, and represent, in—

Figure 1:
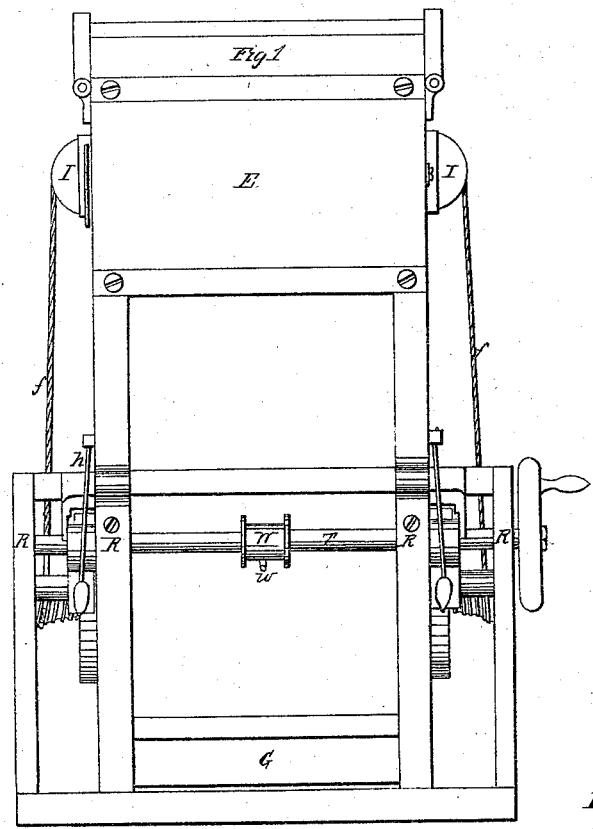
Figure 2:
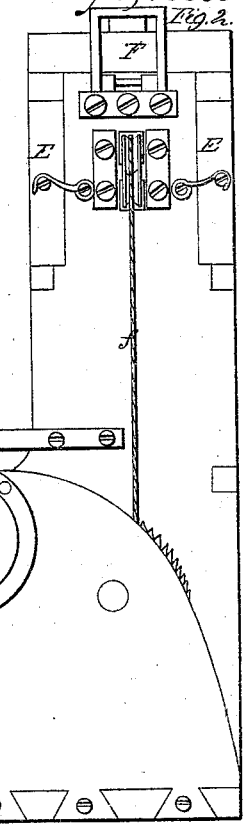
Figure 3:
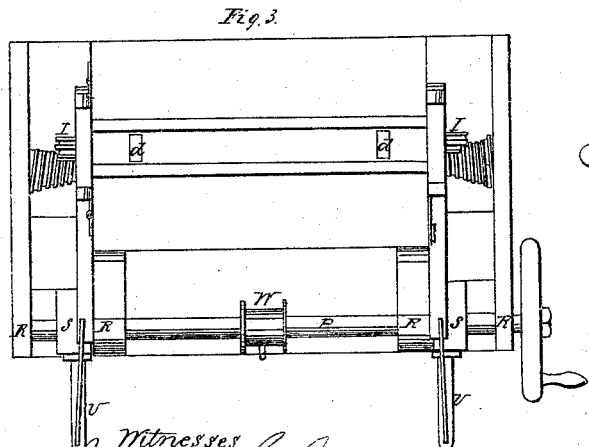
Figures 4, 7:
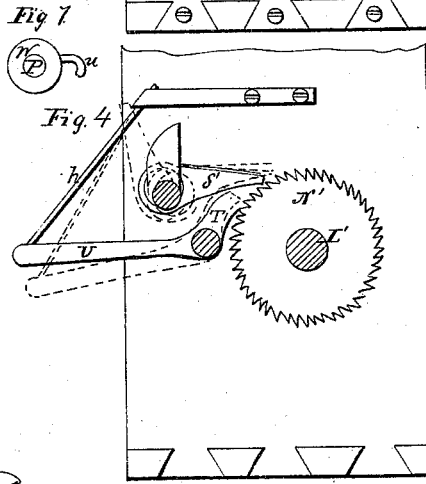

Figure 1, a front view; Fig. 2, a side view; Fig. 3, a top view; Fig. 4, a sectional side view, illustrating the operation of the press; Fig. 5, a vertical central section, and in Fig. 6 a cross-section on line $x$ $x$, looking down.

Our invention is designed with special reference to baling cotton, but is applicable for all similar purposes, the principal feature being the peculiar manner in which we actuate the follower.

To enable others skilled in the art to construct and use our improvement, we will proceed to fully describe the same, as illustrated in the accompanying drawings.

A is the bed-plate; B B, two sides placed upright on the bed A, and, with two other sides, C C, inclose the space D, within which the material to be pressed is placed through doors E E, (see Figs. 1 and 2,) the said doors hinged securely to one of the sides B and as securely locked to the other side B; F, the top of the case, made sufficiently strong, and secured to the sides so as to sustain the pressure required, as seen in Figs. 2 and 5, or other convenient manner, so that if necessary the top may be easily removed; G, the follower, made equally strong and so as to closely fill the space D, the two ends formed so as to enter proper guideways at $a$. (See Fig. 6.) The said guideways are filled above the follower by strips $d$, (see Fig. 5,) so that as the follower rises the strips will also rise, and when the follower is dropped the strips $d$ will drop with it. Thus the guideways $a$ are always filled in the two sides.

On the two sides, and near the top, we fix pulleys I, as seen in Fig. 5, over which a chain or cord, $f$, passes down through chainways $c$, formed in the two sides back of the guideways $a$, and secured to the follower G, or it may be a single cord or chain passing under the follower, as seen in Fig. 5. From the pulleys the said chain $f$ passes down to drums L and L', one upon either side. The said drums, supported in proper bearings M, are of a conical form, with a spiral groove around their surface, into which the chain or cord is wound, beginning at the larger diameter and winding toward the smaller diameter, so that the power of the press increases the more the material is compressed.

To the said drums we fix ratchet-wheels N and N', by the turning of which the chain will be wound upon the two drums in the manner described, and thus raise the follower G. The strips $d$ serve to cover the chain, to prevent its coming in contact with the material being pressed.

The manner of operating the follower is similar to that shown, described, and claimed in the application which we have filed for patent for hoisting apparatus, and is as follows: We fix a shaft, P, in proper bearings R, (see Figs. 1 and 3,) and on the said shaft P we fix eccentrics and pawls S and S', to be operated thereby, as seen in Fig. 4, so that as the said shaft P revolves the eccentrics thereon will move the pawls S and S' as from the position in black to that denoted in red. (See Fig. 4.)

T and T' are stop-dogs, which fall into the ratchet to hold the same as it is revolved by the action of the pawls.

The two eccentrics are set upon the shaft P opposite to each other, so that the pawls act upon their respective ratchets alternately, thus raising the follower one end one notch, then the other end a notch—that is, as from the position denoted by the red line, Fig. 5, to the position denoted by the blue line, then from the position denoted by the blue line up to the position denoted by the second red line, and so on.

By thus operating the follower the whole power is applied alternately to each end, the follower acting as a lever upon the material to be pressed, one end being held as a fulcrum, the other raised by the power, whereby the power of the press is very much increased, if not quite doubled. To lower the follower after it has been thus raised, we extend the stop-dogs T out so as to form levers U, (see Fig. 4,) so that by pressing down said levers U to the position denoted in blue the stop-dogs will strike the pawls and raise them from the wheels, as also denoted in blue, Fig. 4. This will allow the follower, with the strips $d$, to fall, unwinding the chain in their descent from the drums L and L'. The said levers U are held up to the position in black by springs $h$, or their equivalents.

To use our improved press, open one or both of the doors E and place within the case upon the follower the material to be pressed. Then secure the doors and raise the follower by the application of power to the shaft P, through the hand-wheel Y or otherwise, until the material is fully pressed. The quantity to be pressed should be only so much as will allow the follower to rise fully up to the bottom of the doors E. When thus pressed, open the doors, pass cords or their equivalent through the grooves $g$ in the top and in the follower, and bind the bale in the usual manner. In order to draw the cords which bind the bale tightly around the bale, we place upon the shaft P a sleeve, W, which is splined to the said shaft so as to move freely from side to side and get turned with the shaft. To the said sleeve we fix a hook, $w$. (See Fig. 7.) When the bale is compressed and the doors opened, pass the cord around the bale, securing one end to the cord by a slip-knot in the usual manner. Then fix the other end of the cord to the hook $w$ and turn the shaft as before, first throwing out the pawls, as denoted in broken lines, Fig. 4. This will wind up the cord to the required tightness. Then permanently secure the cord, slide the sleeve W along the shaft P to the next position, and secure that cord in like manner. By this arrangement much hard labor and time are saved. When the bale is fully secured release the follower, so that the bale may be removed from the press. When this is done, drop the follower for the second operation.

We do not broadly claim operating the platen of a press by means of two pawls actuated by eccentrics; neither do we broadly claim actuating the platen of a press alternately at each end.

Having therefore thus fully described our invention, what we claim as new and useful, and desire to secure by Letters Patent, is—

1. The combination of the two pawls S and S', having their eccentrics set opposite to each other and upon the same shaft, with the platen of a press, when arranged to operate in the manner described, so as to actuate the platen alternately at each end, substantially as and for the purpose specified.

2. The combination of the hook $w$ with the operative parts of a baling-press, substantially as and for the purpose specified.

DENNIS FRISBIE.
SAMUEL C. GOODSELL.

Witnesses:
JOHN E. EARLE,
M. A. HINE.